United States Patent
Bradley et al.

(10) Patent No.: US 10,839,004 B2
(45) Date of Patent: Nov. 17, 2020

(54) APPROVAL BETWEEN PORTIONS OF CONTENT IN DIGITAL ITEMS

(71) Applicant: International Business Machines Corporation, Armonk, NY (US)

(72) Inventors: Lisa M. Bradley, Cary, NC (US); Liam Harpur, Dublin (IE); Aaron J. Quirk, Cary, NC (US); Lin Sun, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 170 days.

(21) Appl. No.: 15/258,026

(22) Filed: Sep. 7, 2016

(65) Prior Publication Data

US 2018/0067943 A1 Mar. 8, 2018

(51) Int. Cl.
*G06F 16/483* (2019.01)
*G06F 16/955* (2019.01)

(52) U.S. Cl.
CPC .......... *G06F 16/483* (2019.01); *G06F 16/955* (2019.01)

(58) Field of Classification Search
None
See application file for complete search history.

(56) References Cited

U.S. PATENT DOCUMENTS

| | | | |
|---|---|---|---|
| 8,838,564 B2 | 9/2014 | Shani et al. | |
| 9,047,283 B1* | 6/2015 | Zhang | G06F 40/30 |
| 2012/0030244 A1* | 2/2012 | John | G06F 16/958 |
| | | | 707/797 |
| 2013/0325870 A1* | 12/2013 | Rouse | G06F 17/30707 |
| | | | 707/741 |
| 2015/0112814 A1* | 4/2015 | Stokes | G06Q 30/0276 |
| | | | 705/14.66 |
| 2015/0163636 A1* | 6/2015 | Macleod | H04W 4/025 |
| | | | 455/414.3 |
| 2015/0248736 A1* | 9/2015 | Myslinski | G06Q 50/01 |
| | | | 705/319 |
| 2015/0381556 A1 | 12/2015 | Ahrens et al. | |
| 2016/0019298 A1* | 1/2016 | Brodie | G06F 17/30867 |
| | | | 707/734 |
| 2016/0029094 A1 | 1/2016 | Cheung et al. | |
| 2016/0092581 A1* | 3/2016 | Joshi | G06F 17/30672 |
| | | | 707/732 |
| 2016/0092830 A1 | 3/2016 | Goulart | |
| 2016/0378757 A1* | 12/2016 | Bahl | G06N 99/005 |
| | | | 707/728 |
| 2018/0014076 A1* | 1/2018 | Shanson | H04N 21/4821 |

* cited by examiner

*Primary Examiner* — Christopher J Raab
(74) *Attorney, Agent, or Firm* — Michael P. O'keefe; Hunter E. Webb; Keohane & D'Alessandro, PLLC

(57) ABSTRACT

Approaches presented herein enable automatically indicating approval between portions of content in digital items in a digital item network context based on social media activity. Specifically, activity signals (e.g., likes, shares, etc.) related to a social media item in a social media network environment having a topic are evaluated and a set of tags are generated based on the topic. A first portion of content from a first digital item and a second portion of content from a second digital item are selected from a collection of digital items received via a digital item network. The first portion and second portion are related to the topic based on the set of generated tags. An approval action (e.g., likes) is performed between the first portion and second portion.

20 Claims, 6 Drawing Sheets

| DIGITAL ITEM | DIGITAL ITEM LINK | APPROVED PORTION OF CONTENT |
|---|---|---|
| IONS IN THE BRAIN : NORMAL FUNCTION, SEIZURES, AND STROKE | http://books.acme.com/books?id=a | CHAPTER 4, PARAGRAPH 5 |
| ION HOMEOSTASIS OF THE BRAIN: THE REGULATION OF HYDROGEN | http://books.acme.com/books?id=b | CHAPTER 5, PARAGRAPH 10, SENTENCES 1-6 |
| NEURORECEPTORS, ION CHANNELS, AND THE BRAIN | http://books.acme.com/books?id=c | CHAPTER 11, PARAGRAPH 1 |
| CROSS-SECTIONAL ATLAS OF THE BRAIN | http://acmescience.com/brain_article.html | PARAGRAPH 3, SENTENCES 8-12 |

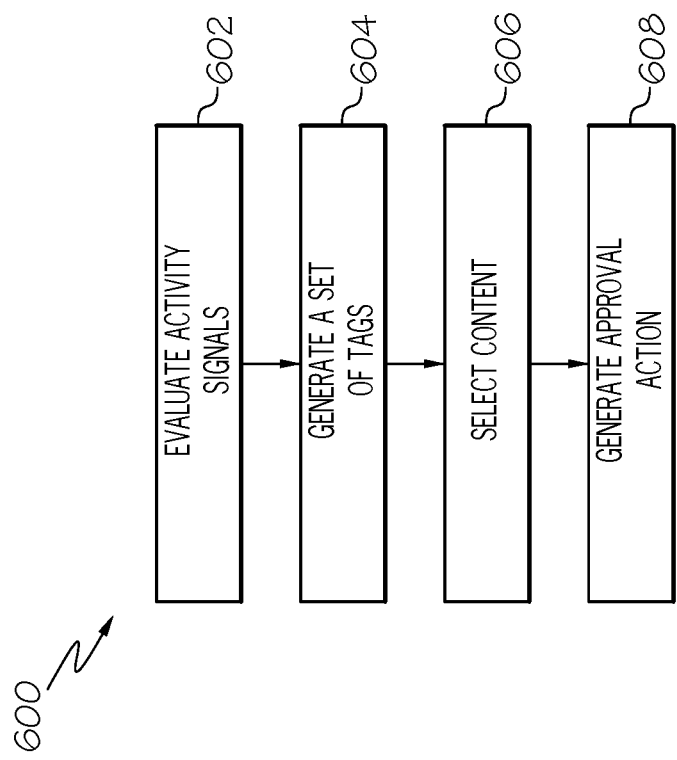

US 10,839,004 B2

APPROVAL BETWEEN PORTIONS OF CONTENT IN DIGITAL ITEMS

TECHNICAL FIELD

This invention relates generally to approving digital content and, more specifically, to automatically indicating approval between portions of content in digital items in a digital item network context based on social media activity.

BACKGROUND

In the networked computing environment of today, social media platforms (e.g., Facebook®, Twitter®, blogs, and/or the like) can provide users with an easy-to-use interface for sharing and/or accessing information on virtually any topic. For example, if a user wants to develop an understanding on a particular topic, then the user can log on to these platforms from a personal computer, cell phone, or other communication device to access various articles, news, blogs, and/or the like, on the Internet related to the topic. However, due to this ease of sharing of information, the amount of information that has been shared has increased exponentially. For example, a user may need to read comments posted by different users on a social networking website on a particular topic to understand a central idea of a discussion. The overflow of information stemming from comments from a number of different users may result in the user re-reading redundant information, thereby wasting time and effort.

SUMMARY

In general, embodiments of the present invention provide a solution for automatically indicating approval between portions of content in digital items in a digital item network context based on social media activity. Specifically, activity signals (e.g., likes, shares, etc.) related to a social media item in a social media network environment having a topic are evaluated and a set of tags are generated based on the topic. A first portion of content from a first digital item and a second portion of content from a second digital item are selected from a collection of digital items received via a digital item network. The first portion and second portion are related to the topic based on the set of generated tags. An approval action (e.g., likes) is performed between the first portion and second portion.

One aspect of the present invention includes a computer-implemented method for automatically indicating approval of digital content, comprising: evaluating one or more activity signals in a social media network related to a social media item having a topic to determine a topic score; generating a set of tags based on the topic when the topic score exceeds a predefined threshold; selecting, from a collection of digital items received via a digital item network, a first portion of content from a first digital item and a second portion of content from a second digital item, wherein the first portion and second portion are related to the topic based on the set of tags; and performing an approval action between the first portion and second portion.

Another aspect of the present invention includes a computer system for automatically indicating approval of digital content, the computer system comprising: a memory medium comprising program instructions; a bus coupled to the memory medium; and a processor for executing the program instructions, the instructions causing the system to: evaluate one or more activity signals in a social media network related to a social media item having a topic to determine a topic score; generate a set of tags based on the topic when the topic score exceeds a predefined threshold; select, from a collection of digital items received via a digital item network, a first portion of content from a first digital item and a second portion of content from a second digital item, wherein the first portion and second portion are related to the topic based on the set of tags; and perform an approval action between the first portion and second portion.

Yet another aspect of the present invention includes a computer program product for automatically indicating approval of digital content, and program instructions stored on the computer readable storage device, to: evaluate one or more activity signals in a social media network related to a social media item having a topic to determine a topic score; generate a set of tags based on the topic when the topic score exceeds a predefined threshold; select, from a collection of digital items received via a digital item network, a first portion of content from a first digital item and a second portion of content from a second digital item, wherein the first portion and second portion are related to the topic based on the set of tags; and perform an approval action between the first portion and second portion.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which:

FIG. 5 shows an example content data table according to illustrative embodiments; and FIG. 6 shows a process flowchart for automatically indicating approval between portions of content in digital items in a digital item network context based on social media activity according to illustrative embodiments.

Figure 1:
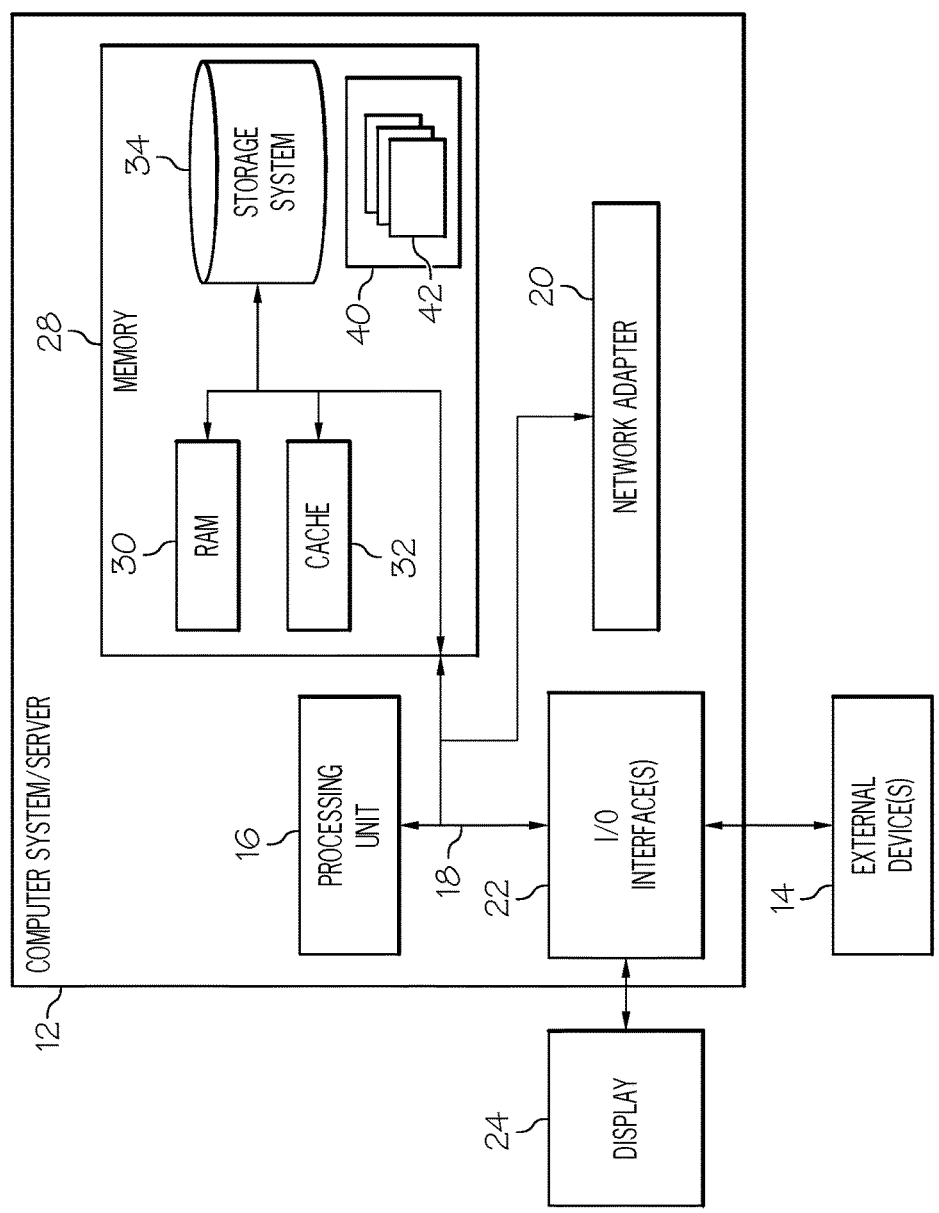
FIG. 1 shows an architecture in which the invention may be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing", "detecting", "determining", "evaluating", "receiving", or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments of the present invention provide a solution for automatically indicating approval between portions of content in digital items in a digital item network context based on social media activity. Specifically, activity signals (e.g., likes, shares, etc.) related to a social media item in a social media network environment having a topic are evaluated and a set of tags are generated based on the topic. A first portion of content from a first digital item and a second portion of content from a second digital item are selected from a collection of digital items received via a digital item network. The first portion and second portion are related to the topic based on the set of generated tags. An approval action is performed between the first portion and second portion.

Referring now to FIG. 1, a computerized implementation 10 of an embodiment for automatically indicating approval between portions of content in digital items in a digital item network context based on social media activity will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system 12 is intended to demonstrate that some or all of the components of implementation 10 could be deployed, managed, serviced, etc., by a service provider who offers to implement, deploy, and/or perform the functions of the present invention for others.

Computer system 12 is intended to represent any type of computer system that may be implemented in deploying/realizing the teachings recited herein. Computer system 12 may be described in the general context of computer system executable instructions, such as program modules, being executed by a computer system. Generally, program modules may include routines, programs, objects, components, logic, data structures, and so on, that perform particular tasks or implement particular abstract data types. In this particular example, computer system 12 represents an illustrative system for automatically indicating approval between portions of content in digital items in a digital item network context based on social media activity. It should be understood that any other computers implemented under the present invention may have different components/software, but can perform similar functions.

Computer system 12 in computerized implementation 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for automatically indicating approval between portions of content in digital items in a digital item network context based on social media activity, which is stored in memory 28, storage system 34, and/or program/utility 40. While executing computer program code, processing unit 16 can read and/or write data to/from memory 28, storage system 34, and program/utility 40.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
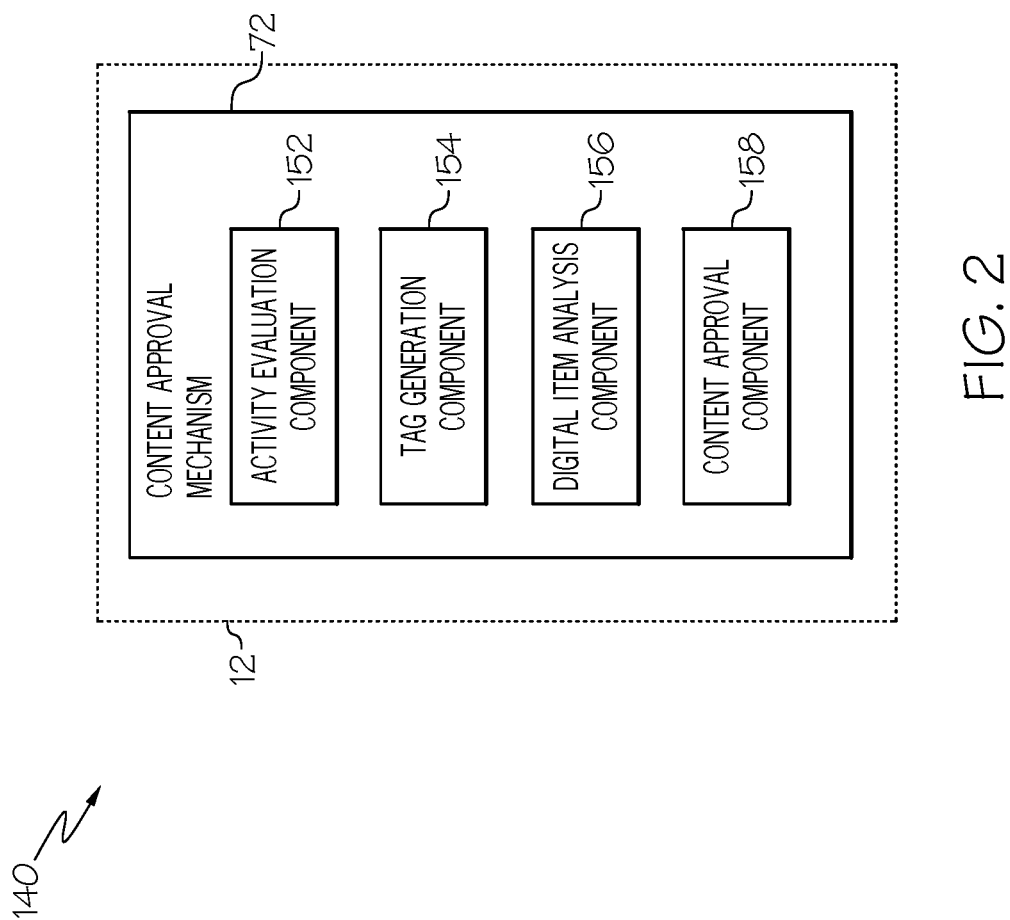
FIG. 2 shows a block diagram illustrating a content approval mechanism 72 according to illustrative embodiments.

Referring now to FIG. 2, a block diagram 140 describing the functionality discussed herein according to an embodiment of the present invention is shown. It is understood that the teachings recited herein may be practiced within any type of computing environment (e.g., computer system 12). To this extent, the teachings recited herein may be practiced within a stand-alone computer system or within a networked computing environment (e.g., a client-server environment, peer-to-peer environment, distributed computing environment, cloud computing environment, and/or the like). If the teachings recited herein are practiced within a networked computing environment, each physical server need not have a content approval mechanism 72 (hereinafter "system 72"). Rather, system 72 could be loaded on a server or server-capable device that communicates (e.g., wirelessly) with the physical server to provide content approval therefor. Regardless, as depicted, system 72 can be implemented as program/utility 40 on computer system 12 of FIG. 1 and can enable the functions recited herein. It is further understood that system 72 can be incorporated within or work in conjunction with any type of system that receives, processes, and/or executes commands with respect to IT resources in a networked computing environment. Such other system(s) have not been shown in FIG. 2 for brevity purposes.

Figure 3:
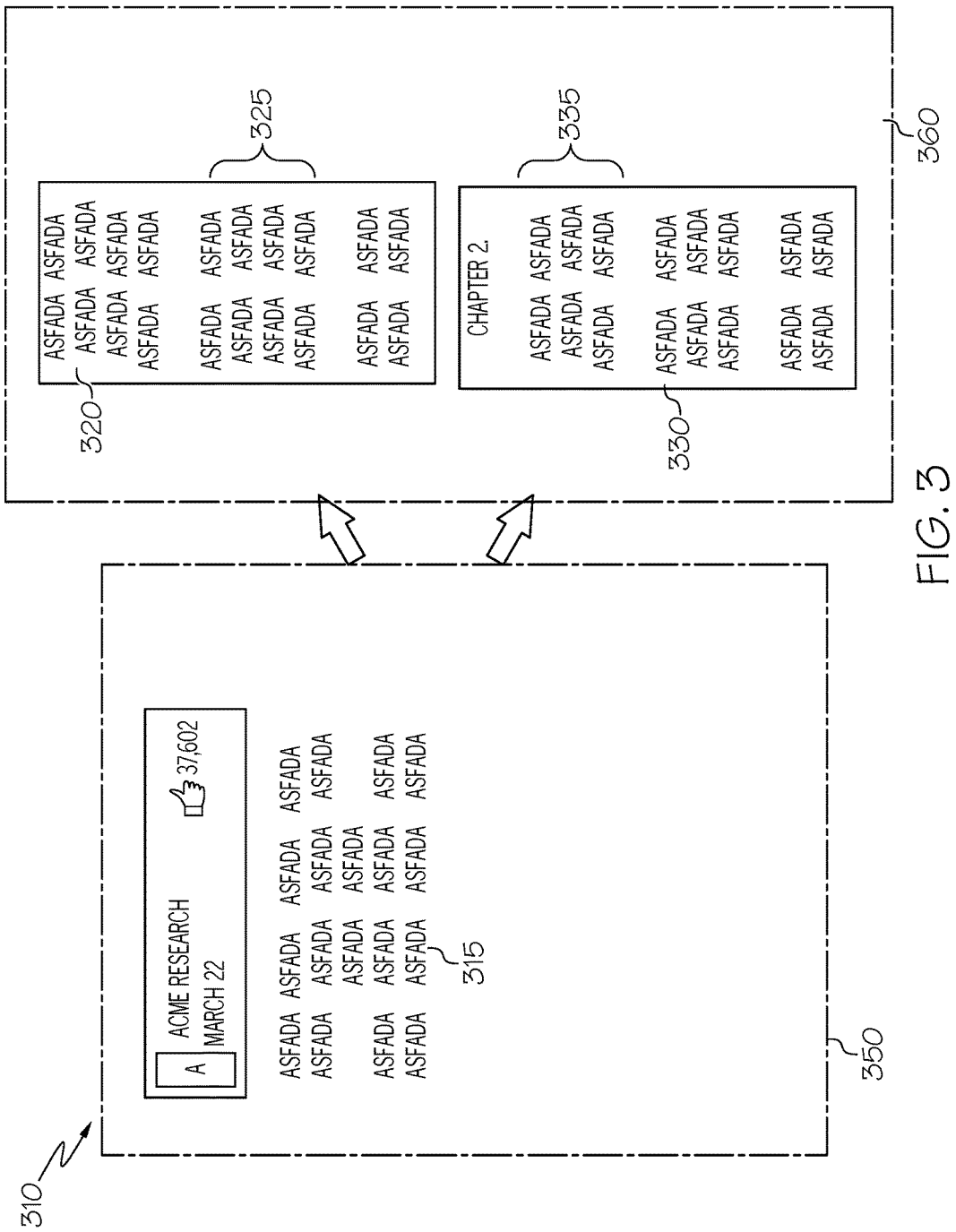
FIG. 3 shows a schematic diagram for indicating approval of a portion of digital item content according to illustrative embodiments.

FIG. 3 shows a high-level schematic diagram 310 for automatically indicating approval between portions of content in digital items in a digital item network context based on social media activity according to an embodiment of the present invention. As shown, a user posts social media item 315 in social media network 350. Due to the favorable activity level (e.g., likes, shares, etc.) related to social media item 315 from other users within social media network 350, one or more digital items residing in digital item network 360 may be selected based on the content of the digital items. More specifically, digital items having a portion of content related to the topic of social media item 315 are selected and an approval action between each related portion (e.g., displaying an approval indicator) is generated. In this example, an approval action between portion 325 of blog post 320 and portion 335 of book 330 are generated because approved portions 325, 330 are related to the topic of social media item 315. For example, portion 325 may like portion 335, and vice versa. The approval action creates a relationship between portion 325 and portion 335 making it easier for user to find similar content. For example, a user reading portion 325 can see there is additional approved content (i.e., portion 335) related to the same topic that can be consumed by the user.

The inventors of the present application have discovered that it is currently difficult for an individual or group to communicate a preference across a network of digital content. Using current solutions, consider the onerous task of trying to evaluate references to a specific topic in all existing digital content on a frequent basis. Such an effort may not be cost-effective and may be prone to error. Because of this, the inventors of the present applications believe that a system is needed that can effectively and dynamically mirror the behaviors of social systems and motivate understanding and visibility of historical digital content. To that end, the approaches described herein provide a seamless way for automatically indicating approval between portions of content in digital items in a digital item network context based on social media activity. As used herein, digital items may include, but are not limited to, books, magazines, articles, web pages, blog entries, social media entries, wikis, tweets, comments, videos, photos, audio, and the like.

Referring again to FIGS. 1 and 2, activity evaluation component 152 of system 72, as executed by computer system/server 12, is configured to evaluate social media behaviors by examining a plurality of activity signals related to one or more social media items in a social media network. Activity signals may include, but are not limited to, views, likes, comments, shares, follows, clicks, conversions, or hover responses related to a social media item. Social media items may include, but are not limited to, social media posts or entries including text, links, images, videos, etc., links to sites/articles, images, videos, etc., shares of previous posts by others, and/or the like.

Figure 4:
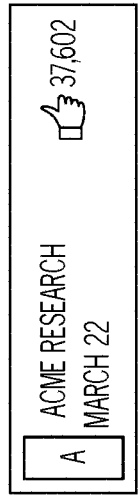
FIG. 4 shows an example social media item according to illustrative embodiments.

Activity evaluation component 152 may ascertain from a social/information network (e.g., Facebook®) that there is a noticeable pattern of behavior related to a particular topic. For example, FIG. 4 shows example social media item (i.e., post) 410 related to the topic of "brain ions." As shown, the post has been liked 37,602 times. The post also includes 1 social media share, 3 positive comments, 6 negative comments, and 3 neutral comments (not shown).

In an embodiment, a topic score may be assigned for each social media item related to a particular topic to determine an activity level. An exemplary topic score scale may provide a −1 for an activity signal identified as completely negative, a 0 for a neutral activity signal, a +1 for a completely positive activity signal, and a positive or negative fractional score for intermediate determinations. Of course, the scale may be shifted (e.g., to all positive numbers), scaled (e.g., to provide a score from −100 to 100 but having no fractional scores), or otherwise modified according to design preferences.

Using the example topic score scale discussed above, a +1 score may be generated for each positive activity signal, such as social media likes and shares. Natural Language Processing (NLP) may be utilized to analyze any activity signals containing text, such as social media comments. The NLP may utilize a Native Bayesian classification system to classify the text as either providing a positive, neutral, or negative sentiment. The Naïve Bayesian classification may, for example, use Python's Natural Language Toolkit (NLTK). Based on the evaluation, a score may be generated for each activity signal as described above (i.e., +1 for a positive comment, etc.). Score values for each activity signal can be tallied to produce a final topic score for each respective social media item.

Referring back to FIG. 4, activity evaluation component 152 generates a topic score of 37,600 by evaluating activity signals related to the post. Using the example topic score scale from above, the topic score of 37,600 is calculated based on 37,602 social media likes, 1 social media share, 3 positive comments, 6 negative comments, and 3 neutral comments (i.e., 37,602+1+3−6+0=37,600). In an embodiment, the topic score may be dynamic and change based on age or other temporal, geographic, or other information related to the activity signals. For example, activity signals older than one week may be excluded when calculating the topic score.

Tag generation component 154 of system 72, as executed by computer system/server 12, is configured to generate a set of tags based on the topic when a predefined activity level is reached. In information systems, a tag is a (relevant) keyword or term associated with or assigned to a piece of information (e.g., a picture, a geographic map, a blog entry, or video clip), thus describing the item and enabling keyword-based classification and search of information. In an embodiment, tags may be derived based on an analysis of any related text using known NLP techniques and/or available metadata related to the social media item. In another embodiment, a user can manually define tags. In one embodiment, the set of tags can be generated when the topic score exceeds a predefined activity level, as defined by an approval threshold. For example, a set of tags may be generated for the social media item shown in FIG. 3 when a predefined threshold of 10,000 exists (i.e., topic score 37,600 exceeds predefined threshold 10,000).

In an embodiment, the set of generated tags may be hierarchical, meaning the set of tags may include one or more general topic tags, as well as one or more content-specific tags. Referring back to the example of FIG. 4, general topic tags may include "brain", "brain operation", and "brain research", while content-specific tags may include "brain ion" and "ion channel". The general topic tags may be used to narrow down the number of candidate digital items within a digital item network to be analyzed, while the content-specific tags may be used when parsing the content of the candidate digital items.

Digital item analysis component 156 of system 72, as executed by computer system/server 12, is configured to select, from a plurality of digital items received via a digital item network, a digital item based on a content of the digital item. The digital item may be selected when at least a portion of content is related to the topic based on the set of generated tags. In an embodiment, digital item analysis component 156 may narrow down the candidate digital items based on the general topic tags. For example, a digital item network may house several thousand digital items (e.g., books, articles, etc.). The general topic tags (i.e., "brain", "brain operation", and "brain research") may be used to narrow the number of candidate digital items to 25 because the vast majority of digital items in the digital item network are unrelated to the brain. Digital item analysis component 156 may parse the content of the 25 candidate digital items to determine portions of content within the digital items which are related to the content-specific tags (i.e., "brain ion" and "ion channel"). In this example, the parsing operation reveals 4 digital items containing portions of content related to the set of tags.

Content approval component 158 of system 72, as executed by computer system/server 12, is configured to generate an approval action between portions of content in one or more digital items. As used herein, an approval action may include, but is not limited to, displaying an approval symbol (e.g., "like" icon, "thumb's up" icon, text, etc.) adjacent to related content portions, displaying an overlay, highlighting text, shading text, underlining text, increasing or decreasing text font size, increasing or decreasing text font weight, boldfacing text, italicizing text, or any other means to distinguish the approved portions of content from the remaining content of the digital items. The approval action is used to establish a relationship between the portions of content that are related to the particular topic.

Referring back to FIG. 3, portion 325 likes portion 335 so that a like symbol is displayed adjacent to portion 335 indicating portion 335 has been liked by other portions of content. Conversely, portion 335 may like portion 325. In an embodiment, a list related to all portions of content that have approved portion 335 may be displayed to a user when portion 335 is being displayed. For example, links to the other portions may be automatically displayed to the user. In another embodiment, the list related to the other portions may be displayed when the user performs a user action, such as clicks on or hovers over the approval indicator (e.g., like symbol). Again, links to the other portions may be displayed based on the user action. In an embodiment, a user can select a link to be automatically taken to the content portion related to the selected link. The list indicates to the user other approved content related to the topic that the user can consume without having to wade through unnecessary content, thereby saving the user time and energy.

FIG. 5 shows example content data table 510 depicting information related to the four portions of content (from the example above) to be approved. As shown, the table columns include a digital item title, a link to the digital item (e.g., a Uniform Resource Locator or "URL"), and a location of the portion in the digital item's content (or the actual portion itself such as text from an article) to be approved. For example, an approval indicator (e.g., "like" icon, "thumb's up" icon, text, etc.) may be displayed adjacent to each approved portion of digital item content when a user views that portion of content.

In an embodiment, an author platform provider (e.g., Google Inc.'s BOOKS™) may allow tagging of digital item content. In this implementation, a "wiki style" overlay may be available to apply an approval indicator, such as a "like" symbol. In this implementation, the author/document can specify that all users or users in a social media network can see approval indicators when viewing digital item content. The platform provider may allow certain content to have the approval indicator added, but the existing content cannot be edited.

In another embodiment, information related to approval indicators may be maintained on a centralized server, such as the approved portion information shown in FIG. 5. When a user views content having an approved portion, a client side plugin can receive the approved portion information and apply it dynamically to the portion of content when being viewed. The client side plugin is simple, for one skilled in the art, to implement using existing techniques. In another embodiment, the platform provider or website owner provider may receive approved portion information and render an approval indicator using dynamic HTML. This also is simple, for one skilled in the art, to implement using existing techniques.

In an embodiment, a notification action may be performed when a number of approval for a portion of content in a digital item exceeds a predefined notification threshold. For example, an author of a particular digital item may be notified if five or more social media items approve the digital item. Notification may include one or more of short message service (SMS), multimedia messaging service (MMS), Internet Protocol multimedia subsystem (IMS), instant message, email message, or the like.

Referring now to FIG. 6, in conjunction with FIGS. 1 and 2, an implementation of a process 600 for automatically indicating approval between portions of content in digital items in a digital item network context based on social media activity is shown. At step 602, activity evaluation component 152 evaluates one or more activity signals in a social media network related to a social media item having a topic to determine a topic score. At step 604, tag generation component 154 generates a set of tags based on the topic when the topic score exceeds a predefined threshold. At step 606, a first portion of content from a first digital item and a second portion of content from a second digital item are selected by digital item analysis component from a collection of digital items received via a digital item network. At step 608, content approval component 158 generates an approval action related to the portion of content of the digital item. The approval action provides a relationship/connection between the approved content portions making it easier for a user to find/consume content related to a particular topic.

Process flowchart 600 of FIG. 6 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for automatically indicating approval between portions of content in digital items in a digital item network context based on social media activity. Thus, embodiments herein disclose a process for supporting computer infrastructure, comprising integrating, hosting, maintaining, and deploying computer-readable code into a computing system (e.g., computer system 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for automatically indicating approval between portions of content in digital items in a digital item network context based on social media activity. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network (for example, the Internet, a local area network, a wide area network and/or a wireless network). The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

It is apparent that there has been provided herein approaches to automatically indicating approval between portions of content in digital items in a digital item network context based on social media activity. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method for automatically indicating approval of digital content, comprising:
    evaluating one or more activity signals in a social media network related to a social media item having a topic to determine a topic score;
    generating a set of tags based on an analysis of related text to the topic in response to the topic score exceeding a predefined threshold, the set of tags being generated in a hierarchical structure;
    selecting, from a collection of digital items received via a digital item network, a first portion of content that is a non-entire portion of textual content contained in a first digital item and a second portion of content that is a non-entire portion of the textual content contained in a second digital item, wherein the selecting of the first portion of content distinguishes the textual content of the first portion of content from other textual content contained in the first digital item and the selecting of the second portion of content distinguishes the textual content of the second portion of content from the other textual content contained in the second digital item, and wherein the first portion and second portion have textual content related to the topic based on the set of tags; and
    automatically performing an approval action from the first portion specifically to the second portion that links the textual content of the first portion contained in the first digital item with the textual content of the second portion contained in the second digital item.

2. The computer-implemented method of claim 1, wherein the approval action includes automatically liking the second portion, wherein the liking is indicated as originating from the first portion.

3. The computer-implemented method of claim 2, further comprising displaying an approval indicator adjacent to the second portion when displaying the second portion, wherein the approval indicator includes a symbol or overlay.

4. The computer-implemented method of claim 3, further comprising displaying a link related to the first portion when displaying the second portion based on a user action, wherein the user action includes clicking on or hovering over the approval indicator.

5. The computer-implemented method of claim 1, wherein an activity signal among the one or more activity signals is selected from a group consisting of: a view, like, comment, share, follow, click, conversion, and hover response.

6. The computer-implemented method of claim 1,
    wherein the hierarchical structure of the set of tags includes at least one higher level tag that is a general topic tag and at least one lower level tag that is a content-specific tag, and
    wherein the selecting further comprises:
        narrowing down a number of candidate digital items within a digital item network to be analyzed, using general topic tags; and
        parsing the content of the candidate digital items using content specific tags.

7. The computer-implemented method of claim 1, wherein the first digital item and second digital item are selected from a group consisting of: a book, magazine, article, web page, blog entry, social media entry, wiki, tweet, comment, video, photo, and audio.

8. A computer system for automatically indicating approval of digital content, the computer system comprising:
    a memory medium comprising program instructions;
    a bus coupled to the memory medium; and
    a processor for executing the program instructions, the instructions causing the system to:
        evaluate one or more activity signals in a social media network related to a social media item having a topic to determine a topic score;
        generate a set of tags based on an analysis of related text to the topic in response to the topic score exceeding a predefined threshold, the set of tags being generated in a hierarchical format;
        select, from a collection of digital items received via a digital item network, a first portion of content that is a non-entire portion of textual content contained in a first digital item and a second portion of content that is a non-entire portion of the textual content contained in a second digital item, wherein selection of the first portion of content distinguishes the textual content of the first portion of content from other textual content contained in the first digital item and selection of the second portion of content distinguishes the textual content of the second portion of content from the other textual content contained in the second digital item, and wherein the first portion and second portion have textual content related to the topic based on the set of tags; and
        automatically perform an approval action from the first portion to the second portion that links the textual content of the first portion contained in the first digital item with the textual content of the second portion contained in the second digital item.

9. The computer system of claim 8, wherein the approval action includes automatically liking the second portion, wherein the liking is indicated as originating from the first portion.

10. The computer system of claim 9, further comprising program instructions to display an approval indicator adjacent to the second portion when displaying the second portion, wherein the approval indicator includes a symbol or overlay.

11. The computer system of claim 10, further comprising program instructions to display a link related to the first portion when displaying the second portion based on a user action, wherein the user action includes clicking on or hovering over the approval indicator.

12. The computer system of claim 8, wherein an activity signal among the one or more activity signals is selected from a group consisting of: a view, like, comment, share, follow, click, conversion, and hover response.

13. The computer system of claim 8,
wherein the hierarchical structure of the set of tags includes at least one higher level tag that is a general topic tag and at least one lower level tag that is a content-specific tag, and
wherein the selecting further comprises:
narrowing down a number of candidate digital items within a digital item network to be analyzed, using general topic tags; and
parsing the content of the candidate digital items using content specific tags.

14. The computer system of claim 8, wherein the first digital item and second digital item are selected from a group consisting of: a book, magazine, article, web page, blog entry, social media entry, wiki, tweet, comment, video, photo, and audio.

15. A computer program product for automatically indicating approval of digital content, comprising a computer readable storage device and program instructions stored on the computer readable storage device, to:
evaluate one or more activity signals in a social media network related to a social media item having a topic to determine a topic score;
generate a set of tags based on an analysis of related text to the topic in response to the topic score exceeding a predefined threshold, the set of tags being generated in a hierarchical format;
select, from a collection of digital items received via a digital item network, a first portion of content that is a non-entire portion of textual content contained in a first digital item and a second portion of content that is a non-entire portion of the textual content contained in a second digital item, wherein selection of the first portion of content distinguishes the textual content of the first portion of content from other textual content contained in the first digital item and selection of the second portion of content distinguishes the textual content of the second portion of content from the other textual content contained in the second digital item, and wherein the first portion and second portion have textual content related to the topic based on the set of tags; and
automatically perform an approval action from the first portion to the second portion that links the textual content of the first portion contained in the first digital item with the textual content of the second portion contained in the second digital item.

16. The computer program product of claim 15, wherein the approval action includes automatically liking the second portion, wherein the liking is indicated as originating from the first portion.

17. The computer program product of claim 16, further comprising program instructions to display an approval indicator adjacent to the second portion when displaying the second portion, wherein the approval indicator includes a symbol or overlay.

18. The computer program product of claim 17, further comprising program instructions to display a link related to the first portion when displaying the second portion based on a user action, wherein the user action includes clicking on or hovering over the approval indicator.

19. The computer program product of claim 15, wherein an activity signal among the one or more activity signals is selected from a group consisting of: a view, like, comment, share, follow, click, conversion, and hover response.

20. The computer program product of claim 15,
wherein the hierarchical structure of the set of tags includes at least one higher level tag that is a general topic tag and at least one lower level tag that is a content-specific tag, and
wherein the selecting further comprises:
narrowing down a number of candidate digital items within a digital item network to be analyzed, using general topic tags; and
parsing the content of the candidate digital items using content specific tags.

* * * * *